United States Patent
Ireland et al.

(10) Patent No.: US 11,433,751 B2
(45) Date of Patent: Sep. 6, 2022

(54) LOW VOLTAGE SYSTEM CONTROLLER FOR A TRUCK

(71) Applicant: Truck Accessories Group, LLC, Elkhart, IN (US)

(72) Inventors: Donald Richard Ireland, Middlebury, IN (US); Terrill D. Becker, Bristol, IN (US); Bruce Charles Bacon, Rockford, MI (US); Jeffrey Joal Hickey, Sturgis, MI (US); Robert G. Bos, Grand Haven, MI (US)

(73) Assignee: Truck Accessories Group, LLC, Elkhart, IN (US)

( * ) Notice: Subject to any disclaimer, the term of this patent is extended or adjusted under 35 U.S.C. 154(b) by 120 days.

(21) Appl. No.: 16/660,975

(22) Filed: Oct. 23, 2019

(65) Prior Publication Data
US 2020/0130485 A1    Apr. 30, 2020

Related U.S. Application Data

(60) Provisional application No. 62/750,981, filed on Oct. 26, 2018.

(51) Int. Cl.
| | |
|---|---|
| *B60J 7/16* | (2006.01) |
| *E05B 83/16* | (2014.01) |
| *B60J 7/06* | (2006.01) |
| *B60J 7/19* | (2006.01) |
| *E05B 79/10* | (2014.01) |
| *G07F 7/00* | (2006.01) |

(52) U.S. Cl.
CPC .............. *B60J 7/1607* (2013.01); *E05B 83/16* (2013.01); *B60J 7/062* (2013.01); *B60J 7/198* (2013.01); *E05B 79/10* (2013.01); *G07F 7/00* (2013.01)

(58) Field of Classification Search
CPC ................................ B60J 7/1607; E05B 83/16
USPC ....................................................... 296/100.07
See application file for complete search history.

(56) References Cited

U.S. PATENT DOCUMENTS

| | | | |
|---|---|---|---|
| 2,926,943 A * | 3/1960 | Leslie | ................... E05B 83/16 292/53 |
| 4,702,095 A | 10/1987 | Ben-Asher | |
| 4,823,059 A | 4/1989 | Compeau et al. | |

(Continued)

FOREIGN PATENT DOCUMENTS

KR    10-2013-0087264 A    10/2013

OTHER PUBLICATIONS

International Search Report; PCT/US19/57773; Filing Date Oct. 24, 2019; dated Mar. 9, 2020.

(Continued)

*Primary Examiner* — Jason S Morrow
(74) *Attorney, Agent, or Firm* — Barnes & Thornburg LLP (57) ABSTRACT

A truck cap assembly that selectively covers a truck bed of a truck is provided. The truck cap assembly may include a cap that sets on opposing side walls of the truck; a cap door located on the cap; a latch bar located on the cap; a controller located on the cap door; and a latch release assembly which includes a motor and a latch arm. The controller is in electrical communication with a motor actuator that is coupled to a latch arm. A signal from the controller activates the motor to move the latch arm. The latch arm is releasable from the latch bar to release the cap door.

18 Claims, 9 Drawing Sheets

(56) References Cited

U.S. PATENT DOCUMENTS

| | | | |
|---|---|---|---|
| 4,917,420 A * | 4/1990 | Rogers, Jr. | E05B 83/16 292/198 |
| 5,247,817 A | 9/1993 | Albrecht et al. | |
| 5,531,086 A | 7/1996 | Bryant | |
| 5,896,769 A | 4/1999 | Elpern et al. | |
| 6,017,067 A * | 1/2000 | Yoneyama | E05B 83/16 292/216 |
| 6,030,019 A | 2/2000 | Stiltner et al. | |
| 6,032,500 A | 3/2000 | Collard, Jr. et al. | |
| 6,048,002 A | 4/2000 | Ohta | |
| 6,354,650 B2 | 3/2002 | Terhaar et al. | |
| 6,676,174 B2 | 1/2004 | Reynolds et al. | |
| 6,761,383 B2 * | 7/2004 | Ju | E05B 83/16 292/216 |
| 7,040,675 B1 | 5/2006 | Ott et al. | |
| 7,303,224 B2 * | 12/2007 | Kim | E05B 83/16 296/76 |
| 7,363,786 B2 | 4/2008 | TerHaar et al. | |
| 8,029,029 B2 | 10/2011 | Terhaar et al. | |
| 8,474,290 B2 | 7/2013 | Terhaar et al. | |
| 9,151,078 B2 | 10/2015 | Lackey | |
| 9,656,697 B2 * | 5/2017 | Puscas | E05C 9/042 |
| 9,719,571 B2 * | 8/2017 | Gruber | F16F 1/445 |
| 10,118,473 B2 | 11/2018 | McDonald, II et al. | |
| 2004/0195857 A1 | 10/2004 | Chverchko et al. | |
| 2005/0029832 A1 | 2/2005 | Verduci et al. | |
| 2007/0096498 A1 | 5/2007 | Kim | |
| 2010/0257786 A1 | 10/2010 | Rock | |
| 2011/0175375 A1 | 7/2011 | Terhaar et al. | |
| 2018/0118006 A1 | 5/2018 | Rohr | |
| 2019/0061499 A1 | 2/2019 | McDonald, II et al. | |
| 2019/0128042 A1 | 5/2019 | Junod | |

OTHER PUBLICATIONS

International Search Report/Written Opinion; PCT/US 19/57773; Filing Dated Oct. 24, 2019; dated Mar. 9, 2020.

PCT Search History; PCT/US 19/57773; Dated of Completion Dec. 16, 2019.

Supplementary European Search Report; 19875708.0-1009 / 3870469 PCT/US2019/057773; dated Jul. 11, 2022.

* cited by examiner

LOW VOLTAGE SYSTEM CONTROLLER FOR A TRUCK

RELATED APPLICATIONS

The present application relates to and claims priority to U.S. Provisional Patent Application, Ser. No. 62/750,981, filed on Oct. 26, 2018. The subject matter disclosed in that provisional application is hereby expressly incorporated into the present application.

TECHNICAL FIELD AND SUMMARY

The present disclosure relates to vehicles such as trucks, pickup trucks and the like. In particular, the present disclosure relates to a truck bed cover such as a pickup truck bed cap or tonneau cover that includes a system controller for an automatic door release system and other functions.

Truck bed covers such as a truck cap or tonneau cover each provide a covering for a truck bed when used in combination with a truck's sidewalls and tailgate. Supported by the bed sidewalls and suspended over the bed of a pickup truck, the truck cap or tonneau cover help create a secured compartment where items may be stored in the bed within the truck.

The truck cap typically includes a door independently movable from the tailgate to provide access within the truck bed through the truck bed cap. Often, the door includes a window pane and a mechanically operated latch system that, in combination with a handle, can be actuated by an individual to latch and unlatch the truck bed cap door. Also, such truck bed cap doors are hinged, typically at the top to allow the door to be swung upwards by the operator after the door has been unlatched. Tonneau covers are typically rolling or folding cover panels suspended over the truck's sidewalls to shroud the truck's bed space underneath.

An illustrative embodiment of the present disclosure provides a truck cap assembly that selectively covers a truck bed of a truck. The truck cap assembly comprises a cap that sets on opposing side walls of the truck; a cap door located on the cap; at least one latch bar located on the cap; a latch release assembly attached to the cap door; and a controller located on the cap door. The controller is in electrical communication with the latch release assembly. The latch release assembly includes a motor actuator, a clip, and a rotary latch. The clip is movable by the motor and is coupled to the rotary latch. A signal from the controller activates the motor which moves the clip. The rotary latch includes a latch arm that is movable about a pivot pin. The latch arm of the rotary latch is engagable with and releaseable from the latch bar. As the motor moves the clip, the clip moves the latch arm to cause the latch arm to pivot about the pivot pin which releases the latch arm from the latch bar to release the cap door.

In the above and other illustrative embodiments, the truck cap assembly may further comprise: at least one prop attached to the cap and the cap door; when the latch arm is released from the latch bar the latch arm pushes against latch bar to separate at least a portion of the cap door from the cap; at least one prop attached to the cap and the cap door, wherein when the latch arm is released from the latch bar, wherein the latch arm pushes against the latch bar to separate at least a portion of the cap door from the cap; and wherein the prop moves the cap door to an open position; an input device that sends a signal to the controller to release the latch arm from the latch bar to release the cap door, wherein the input device is selected from the group consisting of at least one of a keypad, a phone app, a key fob, a key, a Bluetooth device, a Wifi device, a RFID device, a NFC device, and a computer; the clip is pulled by the motor; a second latch release assembly attached to the cap door spaced apart from the latch release assembly, wherein the second latch release assembly includes a motor actuator, a clip, and a rotary latch, wherein the controller is in electrical communication with the second latch release assembly, wherein the signal from the controller activates the motor of the second latch release assembly which moves the clip which moves a latch arm to cause the latch arm to pivot about the pivot pin which releases the latch arm from the a second latch bar on the cap to release the cap door; a mechanical override assembly located on the cap door which comprises: a rotating member, a first cable is attached to a first post on the rotating member, wherein the first post is offset from an axis extending through the rotating member, wherein the first cable is attached to the latch arm of the rotary latch of the latch release assembly so that as the rotating member rotates, the first cable moves to move the latch arm of the rotary latch of the latch release assembly to release from the latch bar; a key cylinder that is rotated which rotates a rotating member; a mechanical override assembly located on the cap door, the mechanical override assembly comprises: a rotating member, a first cable attached to a first post on the rotating member, a second cable attached to a second post on the rotating member, wherein the first and second posts are located offset from an axis of rotation of the rotating member, wherein the first cable is attached to the latch arm of the rotary latch of the latch release assembly and the second cable is attached to the latch arm of the rotary latch of the second latch release assembly, wherein as the rotating member rotates, both first and second cables move so the first cable moves the latch arm of the rotary latch of the latch release assembly, to release from the latch bar and the second cable moves the latch arm of the rotary latch of the second latch release assembly to release from the second latch bar; and a key cylinder that is rotated which rotates a rotating member.

Another illustrative embodiment of the present disclosure provides a truck cap assembly that selectively covers a truck bed of a truck. The truck cap assembly comprises: a cap that sets on opposing side walls of the truck; a cap door located on the cap; a latch bar located on the cap; and a controller located on the cap door; and a latch release assembly which includes a motor and a latch arm. The controller is in electrical communication with a motor actuator that is coupled to a latch arm. A signal from the controller activates the motor to move the latch arm. The latch arm is releaseable from the latch bar to release the cap door.

In the above, and other illustrative embodiments, the truck cap assembly may further comprise: at least one prop attached to the cap and the cap door; when the latch arm is released from the latch bar, and wherein the latch arm pushes against latch bar to separate at least a portion of the cap door from the cap; at least one prop attached to the cap and the cap door, wherein when the latch arm is released from the latch bar the latch arm pushes against latch bar to separate at least a portion of the cap door from the cap; and wherein the prop moves the cap door to an open position; and an input device that sends a signal to the controller to release the latch arm from the latch bar to release the cap door, wherein the input device is selected from the group consisting at least one of a keypad, a phone app, a key fob, a key, a Bluetooth device, a Wifi device, a RFID device, a NFC device, and a computer.

Another illustrative embodiment of the present disclosure provides a truck cap assembly that selectively covers a truck bed of a truck. The truck cap assembly comprises: a cap that sets on opposing side walls of the truck; a cap door located on the cap; a latch bar; and a latch release assembly which includes a motor and a latch arm. The motor selectively moves the latch arm. The latch arm is releaseable from the latch bar to release the cap door. The latch bar is located on the cap and the latch release assembly is located on the cap door.

In the above and other illustrative embodiments, the truck cap assembly may further comprise: the latch bar is located on the cap door and the latch release assembly is located on the cap.

Another illustrative embodiment of the present disclosure provides a method of opening a truck cap door located on a truck cap assembly that selectively covers a truck bed of a truck. The method comprises the steps of: powering a controller; determining if the controller has timed out by determining if a wake command has been issued, wherein if no wake command issued controller proceeds to a sleep mode; determining what type of device has created the wake command, wherein the device is selected from the group consisting of a wired input and a wireless input, wherein if the signal is generated by the wired input the controller determines if a correct predetermined sequence has been entered, wherein if the predetermined sequence was incorrect, a signal is initiated and the controller proceeds to await mode; energizing a power relay from a battery to an actuator circuit if the predetermined sequence was correct; energizing an actuator from the actuator circuit; moving a clip by the energized actuator which moves a latch arm; releasing a latch bar from the latch arm which unlatches at least a portion of the cap door from the cap; and de-energizing the actuator which returns the controller to the wait mode.

In the above and other illustrative embodiments, the method may further comprise the additional steps of: energizing the power relay from the battery to the actuator circuit if the signal was generated by the wireless input to the controller; and if the predetermined sequence was not a correct predetermined sequence no signal is sent to the power relay to provide power to the actuator circuit, pairing the wireless device.

Additional features and advantages of the control assembly for a truck will become apparent to those skilled in the art upon consideration of the following detailed descriptions of carrying out the control assembly for the truck as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the low voltage control assembly and such exemplification is not to be construed as limiting the scope of the low voltage control assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a truck bed cap that includes a swing door to allow access to the interior bed of the truck. Rather than being mechanically actuated by hand, however, the truck bed cap door on the truck bed cap of the present disclosure is automatically unlatched upon receipt of an electronic signal. Once the truck bed cap door is unlatched, it may either be manually moved or in conjunction with a gas spring, cylinder, motor, or other like mechanisms, be moved to its open position to add even further convenience. That electronic signal may be initiated by a keypad (e.g., capacitive touch, button, etc.) on the truck, phone app, key fob, key, Bluetooth, Wifi, radio-frequency identification (RFID) device, near-field communication (NFC) device, computer, or other mobile connected device. There is now no longer need for T-handles, knobs, or other locking/latching/related structures needed to extend from the truck bed cap. Without this hardware, more design possibilities exist with the truck bed cap, as well as enhanced convenience to the operator. It is appreciated that the system is low voltage because it may be power from the truck's on-board low voltage (e.g., 12 volt) electrical system.

Additionally, a mechanical override mechanism may be added to the truck bed cap so that if an electronic failure occurs with the automatic door release assembly, the mechanical override may be actuated to open the door. It is appreciated that the mechanical override mechanism may be incorporated with the door inconspicuously so as to maintain a hardware-free look on the truck bed cap about the vicinity of the door.

Truck Cap Cover Control

Figure 1:
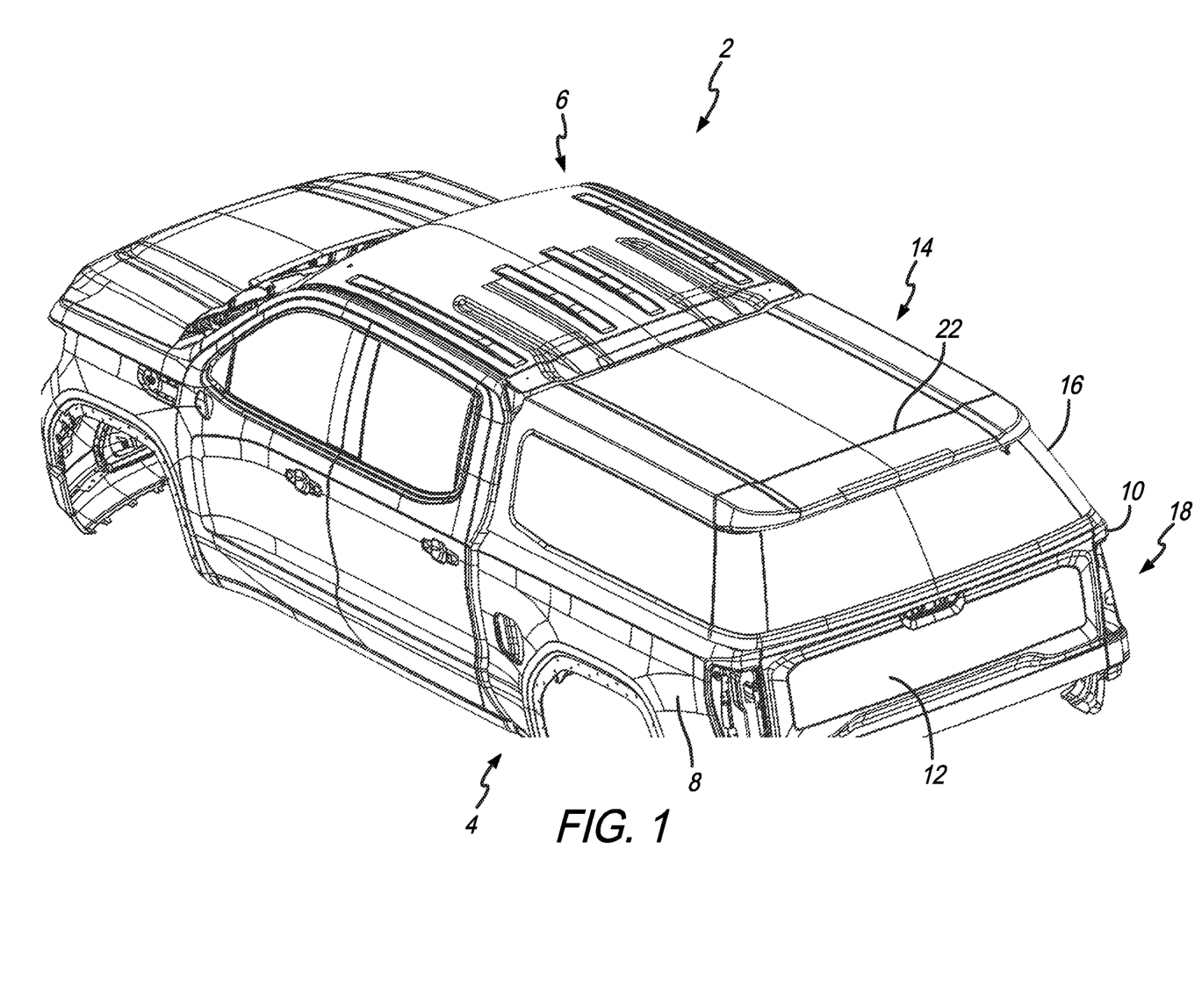
FIG. 1 is a rear perspective view of a pickup truck having a bed section located rearward of a cab section and a cap located on the bed section.

A rear perspective view of a pickup truck 2, having a bed section 4 located rearward of cab section 6, is shown in FIG. 1. Upward extending sidewalls 8 and 10, with tailgate 12 extending therebetween, form the side and rear bounds of bed section 4 of pickup truck 2. Extending across upward extending sidewalls 8 and 10, while covering bed section 4, is truck bed cap 14. Illustratively, truck bed cap 14 includes a cap door 16. As illustrated, cap door 16 is located on the rear section 18 of truck bed cap 14 adjacent tailgate 12. The skilled artisan upon reading this disclosure will appreciate, however, that cap door 16 may be located on any portion of truck bed cap 14 including sidewalls 8 and 10. The location of cap door 16, as disclosed herein, is for illustrative purposes. Furthermore, the configuration of cap door 16—whether having a window or not—is also illustrative. Still further, cap door 16 illustratively includes a hinged section 22, thereby making it an upward extending swing door. Again, the use of hinges and the manner in which cap door 16 opens as also depicted herein is for illustrative purposes, cap door 16 may have hinges on any side thereof. Furthermore, it is contemplated within the scope of this disclosure that other hinged-like or slide type mechanisms to securely move the door between latched/unlatched or open/closed positions are included.

Figure 2:
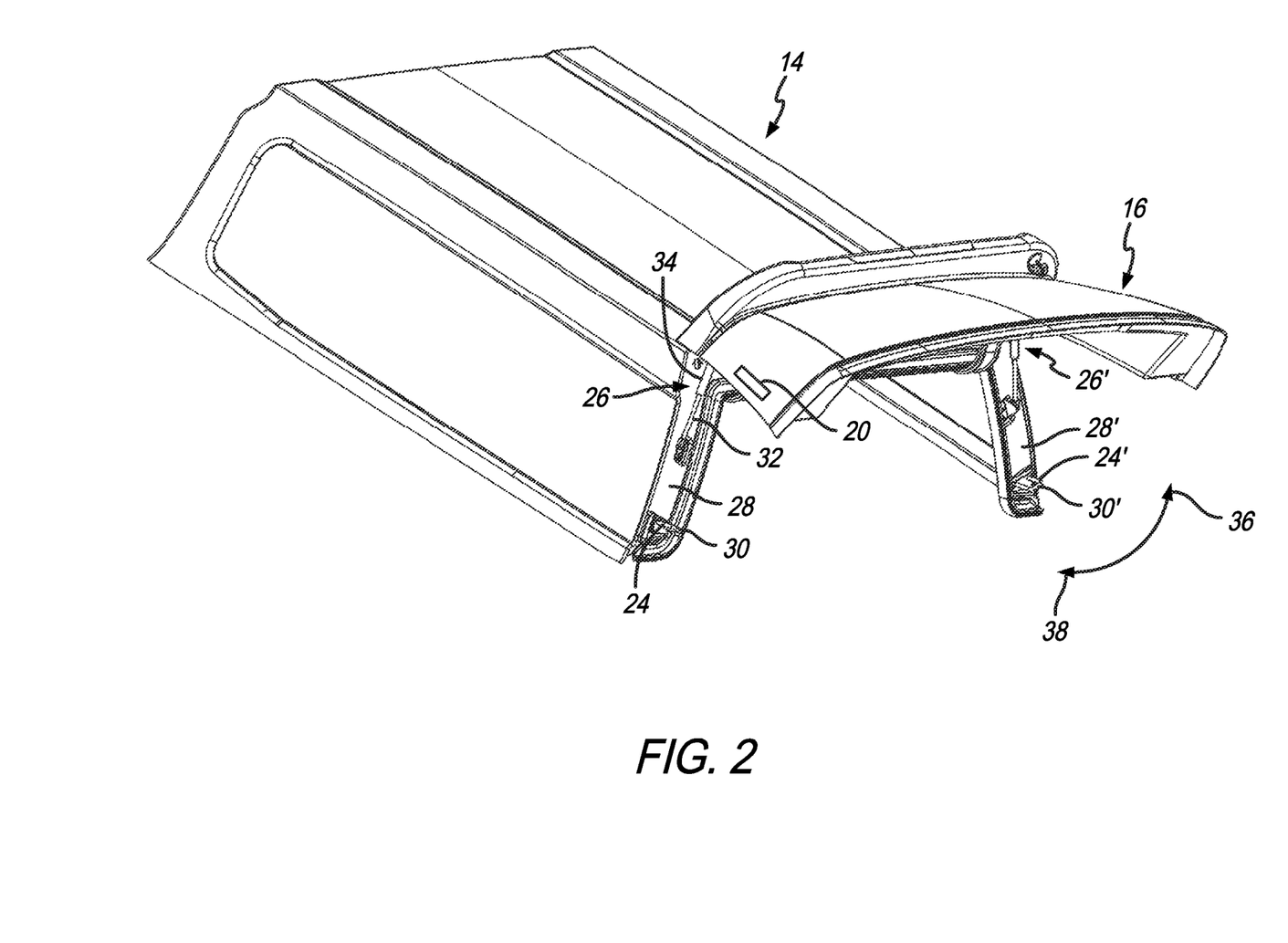
FIG. 2 is a rear perspective isolated view of the truck cap and truck cap door of the present disclosure.

A rear perspective isolated view of truck bed cap 14 from pickup truck 2 from FIG. 1 is shown in FIG. 2. In this view, cap door 16 is depicted in its unlatched condition. In an illustrative embodiment, a keypad 20 may be positioned on cap door 16 configured to accept an input combination that will release same. In the illustrated embodiment, keypad 20 is located on the side of cap door 16. It is contemplated to be within the scope of this present disclosure that keypad 20 may be located anywhere on cap door 16. Also, keypad 20 may alternatively be located on pickup truck 2, either or both, in bed section 4 or cab section 6. Also, it is contemplated to be within the scope of this disclosure that other mechanisms for activating cap door 16 may include a phone app, key fob, key, Bluetooth device, Wifi device, RFID device, NFC device, computer, other mobile connected device, or similar electronic input device or mechanism.

Figure 3:
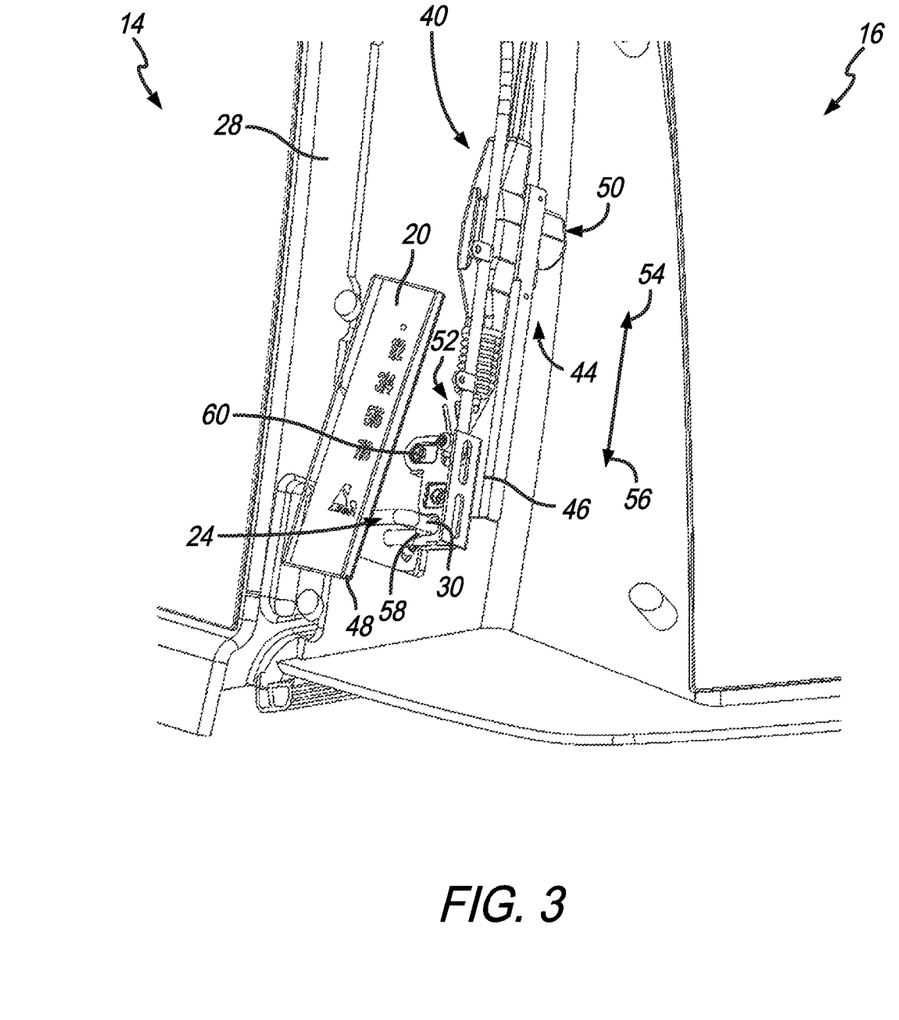
FIG. 3 is a perspective detail view of a latch release assembly located inside the cap door and latched onto the truck cap.
Figure 6:
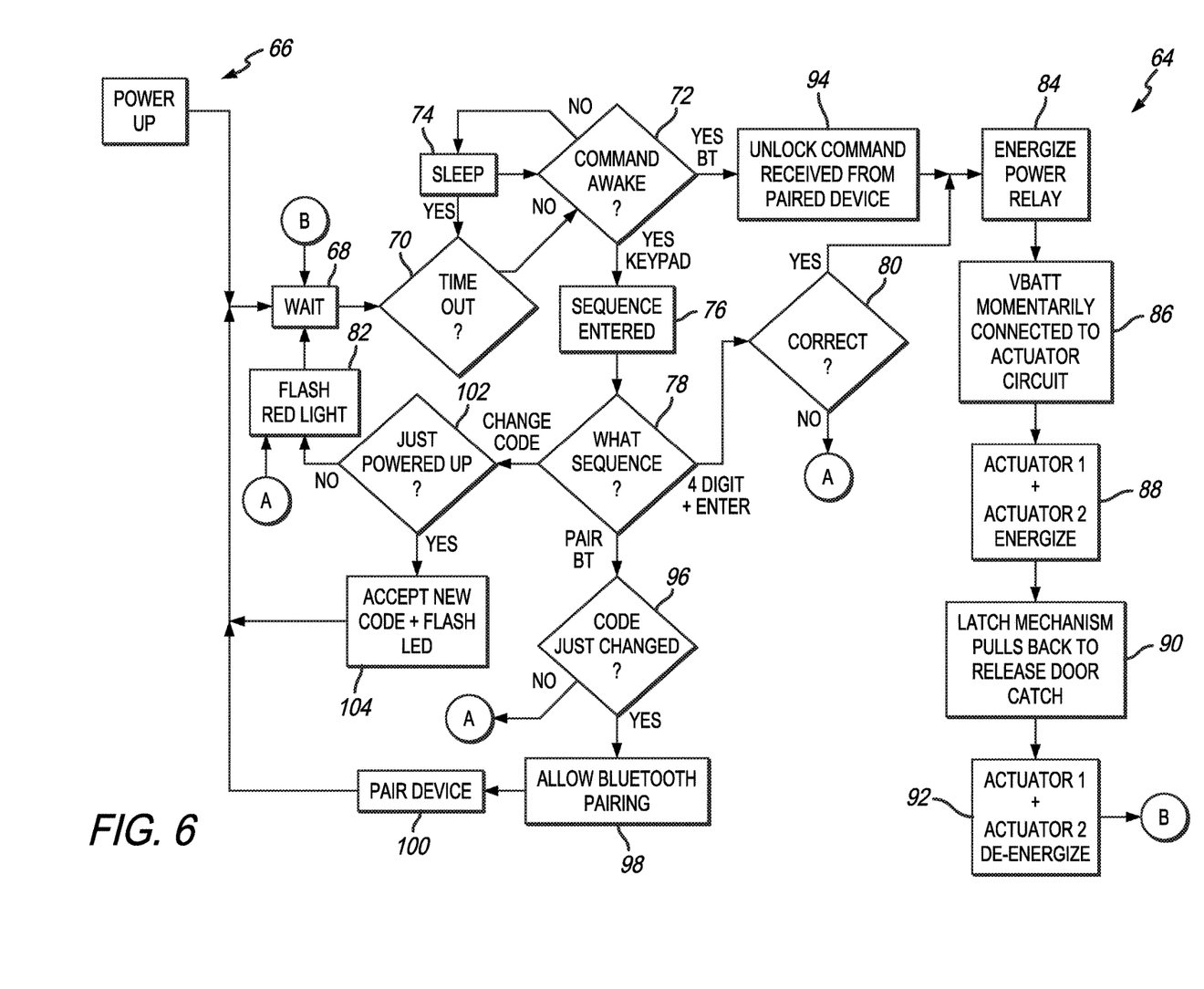
FIG. 6 is a flowchart depicting an embodiment of a latch release process.

With respect to keypad 20, it may include a capacitance touch screen, physical buttons, or other type of input mechanism that produces an electronic signal to initiate the unlatching sequence (see, e.g., FIG. 6). Also shown in this illustrative embodiment are strikers 24 and 24'. Also shown are gas props 26 and 26' on each side of cap door 16. These structures are attached to panel 28 and 28', respectively, located within truck bed cap 14 adjacent cap door 16. With respect to striker 24 (and 24'), it includes a push bar 30 which, as shown in FIG. 3, is configured to engage a rotary latch to secure cap door 16 to truck bed cap 14. It will be appreciated that the illustrated configuration shown of strikers 24 and 24' are illustrative, and that other like designs may be configured to be engaged with a latch that holds a door, is contemplated within the scope of this disclosure.

With regard to gas props 26 and 26', the skilled artisan will appreciate upon reading this present disclosure that such gas props are known in the art to have an extension rod connected to a gas piston in a cylinder. The extension rod will continue to extend from the gas cylinder when the extension rod is initially moved via external force. In this case, an extension rod 32 extends from cylinder 34 of gas prop 26. Accordingly, when cap door 16 is released from striker 24, the initial movement of cap door 16 in direction 36 towards an open position will be sufficient to move extension rod 32 from cylinder 34. Upon this initial movement, gas props 26 and 26', as known by those skilled in the art, will continue extending extension rods 32 and 32', respectively. This has the effect of further moving cap door 16 in direction 36 towards an open position.

It is appreciated that the illustrative configuration of gas props 26 and 26' in relation to either or both cap door 16 and panel 28 are illustrative and alternate configurations may be employed with the function of assisting moving cap door 16 to an at least released condition, if not also a fully open position. Such mechanisms are within the scope of the present disclosure as well. Alternate mechanisms may include motorized (classic rotor/stator, brushless DC motors, or linear induction motors) door lifts, hydraulically actuated pistons, torsion springs, human operator (in the event the gas props do not provide sufficient force to allow the door to fully open). It will be further appreciated by the skilled artisan that a plurality of only one striker 24 and gas prop 26 may be positioned on cap door 16 to open same upon actuation of the latch via input from keypad 20 or other source.

A perspective detail view of latch release assembly 40 located inside cap door 16 is shown in FIG. 3. Specifically, this view is looking inside truck bed cap 14 through cap door 16. Latch release assembly 40 is attached to interior surface of cap door 16. As shown herein, latch release assembly 40 includes a motorized actuator 44 and rotary latch assembly 46. A controller 48 is illustratively in electrical communication with keypad 20 and receives an input signal from keypad 20 that, if correct, initiates the process of unlatching cap door 16. In the illustratively embodiment, controller 48 is shown attached to the back side of keypad 20. A skilled artisan upon reading this disclosure will understand that such configuration is illustrative and controller 48 may be located in any other convenient location for production of the truck bed cap 14. It is also appreciated, as will be discussed with respect to FIG. 6, controller 48 may receive signals from wireless sources such as a Bluetooth device, Wifi device, RFID device, NFC device, computer, other mobile connected device to initiate the latch release process. Controller 48 sends a signal (i.e., voltage) to motorized actuator 44 when an unlock command is received from keypad 20 or a paired device.

An illustrative embodiment of motorized actuator 44 may comprise a motor 50 and clip 52. It is appreciated that motor 50 may encompass various forms including a rotating motor or a push/pull solenoid, for example. When an unlock command is received from controller 48, motor 50 is activated to move clip 52 to activate rotary latch assembly 46. In an illustrative embodiment, motor 50 pulls or draws clip 52 as indicated by direction 54 thereby pulling clip 52 in the same direction. Also being attached to rotary latch arm 58, clip 52 causes same to pivot about bolt 60 which moves rotary latch arm 58 to release and push bar 30 of striker 24 so cap door 16 is released and pushed (i.e., moved) in direction 36 (see, also FIG. 2). By rotary latch assembly 46 both releasing and pushing push bar 30 in direction 36, that initial moment is enough to cause gas prop 26 to begin extending extension rod 32 which will be able to be continued even after no more external force is being applied to push bar 30.

It is appreciated that rotary latch 46 may be of any type known to secure vehicle doors. It is also appreciated that other latch-type assemblies may be used in conjunction with motorized actuator 44 or other actuator configurations to create the necessary latch release upon receiving an unlock command from controller 48. Indeed, in other embodiments, the latch may be an assembly that moves a clip or other structure in direction 56 to create the disengagement between the door and the truck cap.

Figure 4:
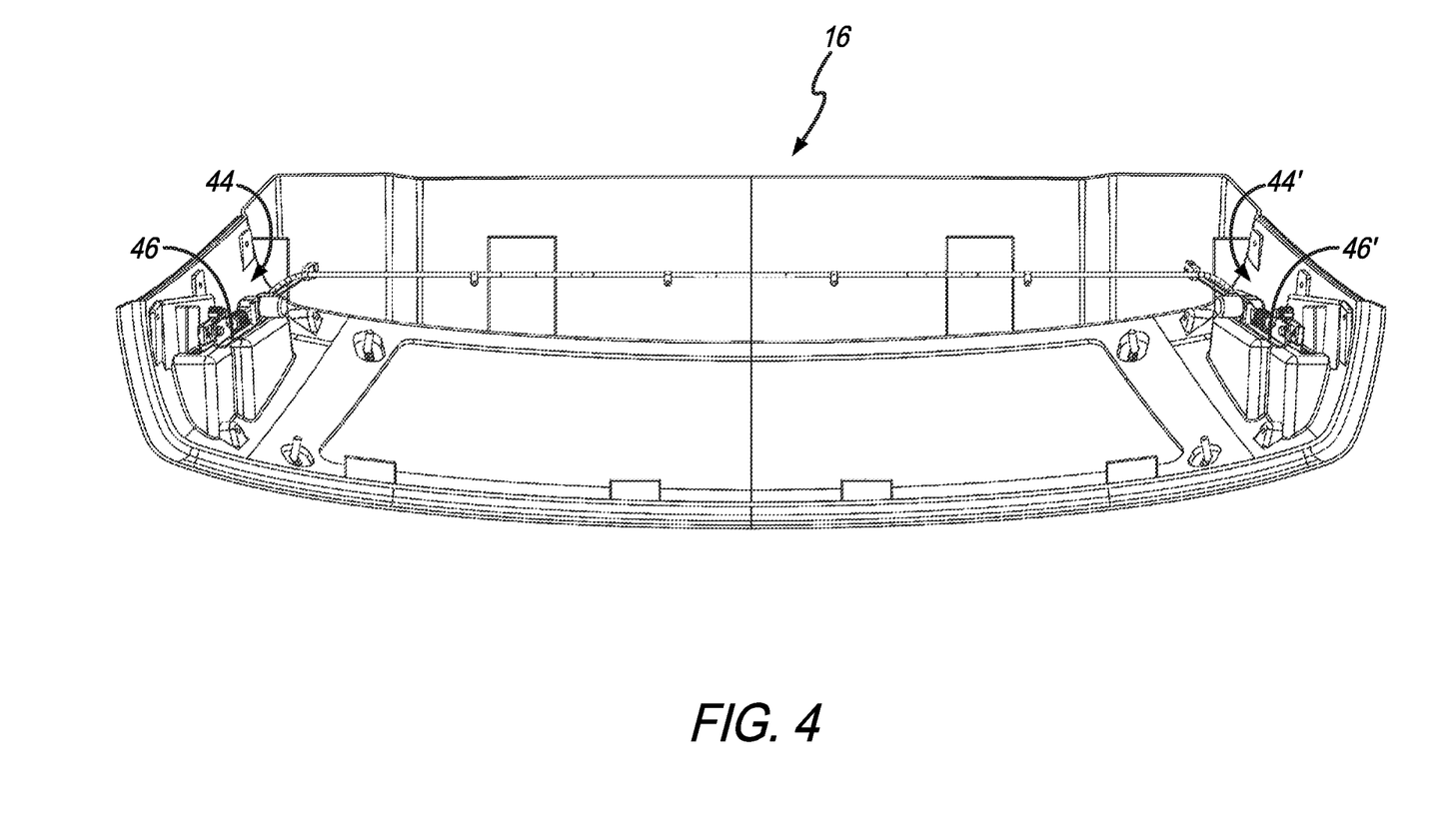
FIG. 4 is an isolated upward-looking perspective view of the truck cap door.

An isolated upward-looking perspective view of cap door 16 of truck bed cap 14 is shown in FIG. 4. This view depicts the illustrative positioning of motorized actuator 44 and rotary latch assembly 46 located around one side of cap door 16 while a second actuator 44' and rotary latch 46' are on the distal opposed side of cap door 16. It will be appreciated from this view as well that other actuation and latch-type assemblies may be attached to cap door 16 to release same from truck bed cap 14. Also, in another embodiment, a single actuator and latch assembly may be employed on such a door. Such assembly may also be located at a different position on the door. All of these are contemplated to be within the scope of this disclosure.

Figure 5:
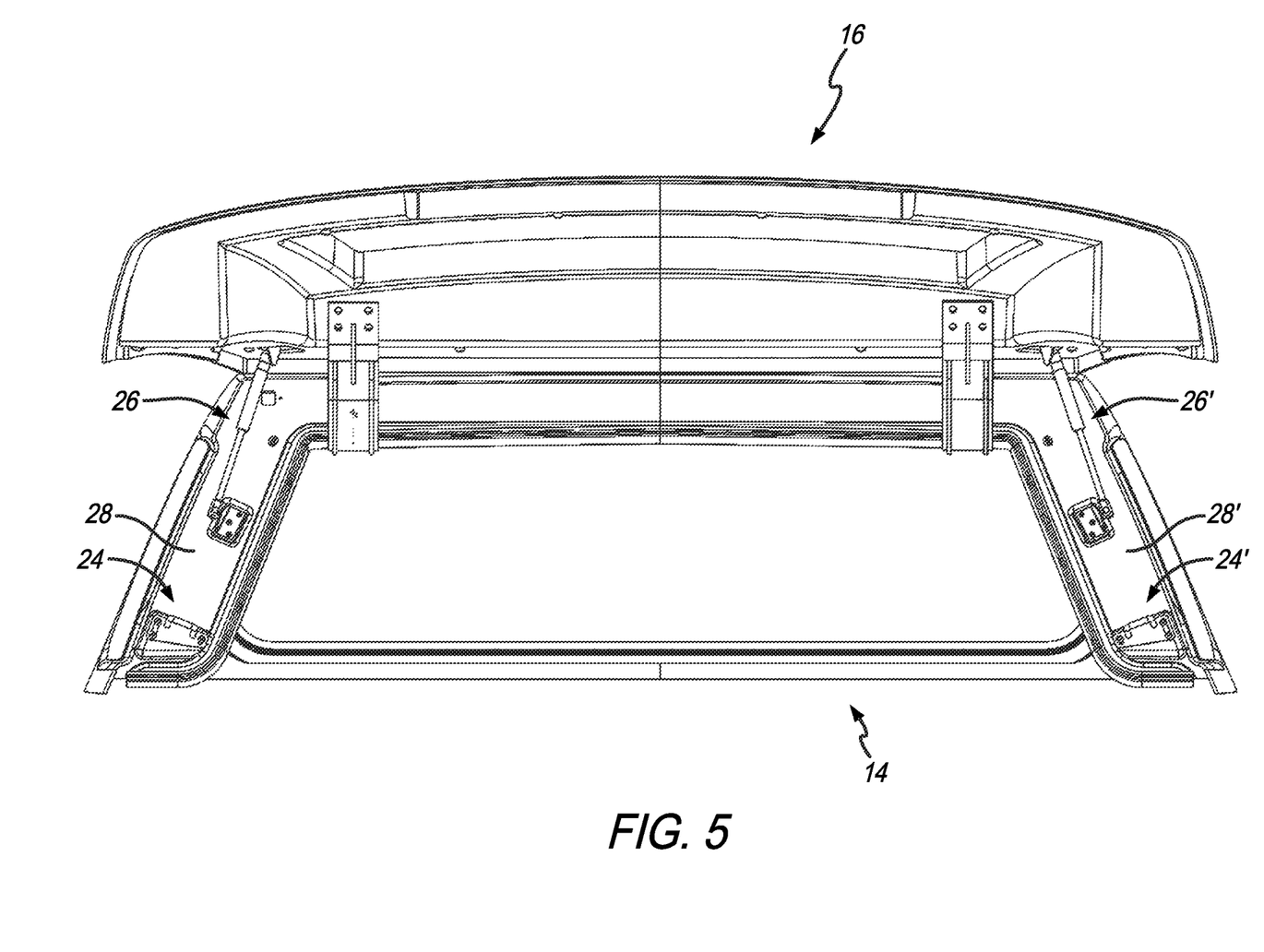
FIG. 5 is an isolated rear view of the cap door.

An isolated rear view of cap door 16 of truck bed cap 14 is shown in FIG. 5. This view again shows the illustrative embodiment of strikers 24 and 24', as well as gas props 26 and 26' on each side of cap door 16. These structures are attached to panel 28 and 28', respectively, located within truck bed cap 14 adjacent cap door 16. It is also further appreciated in this view how latch release assemblies are located in cap door 16 rather than on truck bed cap 14. It is appreciated, however, that components of the latch release assemblies may be positioned on panels 28/28' or other locations on truck bed cap 14. These are contemplated to be within the scope of the disclosure.

As previously discussed, either entry of a keypad/touch-panel command or wireless signal from a paired device is read by controller 48 in order to send an unlock command to actuator 44. The diagram in FIG. 6 depicts an illustrative embodiment of a latch release process 64 employed by keypad 20 (or paired device), controller 48, and actuator 44. An initial step of latch release process 64 is for controller 48 to power up as indicated by reference numeral 66. At that point, controller 48 waits as indicated by reference numeral 68 for a predetermined period of time. As indicated at 70, controller 48 waits until it times out, but it determines if that has occurred. To do this, controller 48 determines if a wake command 72 has been issued. If no wake command issued, controller 48 will return to sleep mode 74. If a wake command 72 has been issued, controller 48 then determines what type of device has created this wake command—either keypad 20 or a wireless paired device. If the signal was generated by keypad 20, controller 48 determines if a sequence has been entered at 76. If a sequence has been entered, controller 48 then determines what the sequence was at 78, and if it was correct at 80. If the sequence was not correct, then a flashing light sequence at 82 is initiated and the routine of controller 48 going back to wait mode at 68. If the sequence was correct, a power relay is energized at 84. Power relay 84 connects power from a battery, typically the vehicle's battery, to actuator circuits in actuator 44, as indicated at 86 of unlatching release process 64. Actuator circuits at 86 then energize actuators 44 and 44' (see FIGS. 3 and 4) at 88 of unlatching release process 64. Energizing actuators 44 and 44' moves clip 52 which illustratively pulls on rotary latch assembly 46 as indicated at 90 thus releasing push bar 30 from striker 24 and unlatching cap door 16. After this process, actuators 44 and 44' are then de-energized as indicated at 92, after which controller 48 returns to its wait mode 68 and being available to perform the process over again.

Alternatively, if wake command 72 was received from a Bluetooth, or other paired wireless device instead of a keypad, the power relay again connects power from the battery at 84 which proceeds to energize actuators 44 and 44'. The process of unlatching cap door 16 then becomes essentially the same as the keypad process at this point.

Alternatively, at wake command 72, if a sequence is entered from keypad 20 or other like wired input device, such as that indicated at 78, such sequence may be something other than an unlatch code. In this case, no signal is sent to the power relay at 84 to provide power to the actuators. Rather, the sequence may relate to pairing the Bluetooth or other wireless device. In this case, controller 48 determines if the code was changed at 96. If "no," keypad 20 flashes its lights at reference number 82 and returns to its wait mode at 68. If the code was changed, then controller 48 allows the Bluetooth, or other wireless paring at 98 at which time the device is paired as indicated at 100. Controller 48 then returns to its wait mode 68 to begin latch release process 64 over again.

Lastly, sequence 78 is a code change to either prepare a Bluetooth or wireless device, or enter in a new unlatch code (see block 80). This is determined at 102. If controller was just powered up at 102, the new code is accepted. The lights on controller 48 can indicate same and the process is started again by going to wait mode 68. If, on the other hand, the answer is "no," then the lights provide an indication of same (no new code is accepted) and controller 48 returns to its wake mode 68 to begin the process over again.

Figure 7:
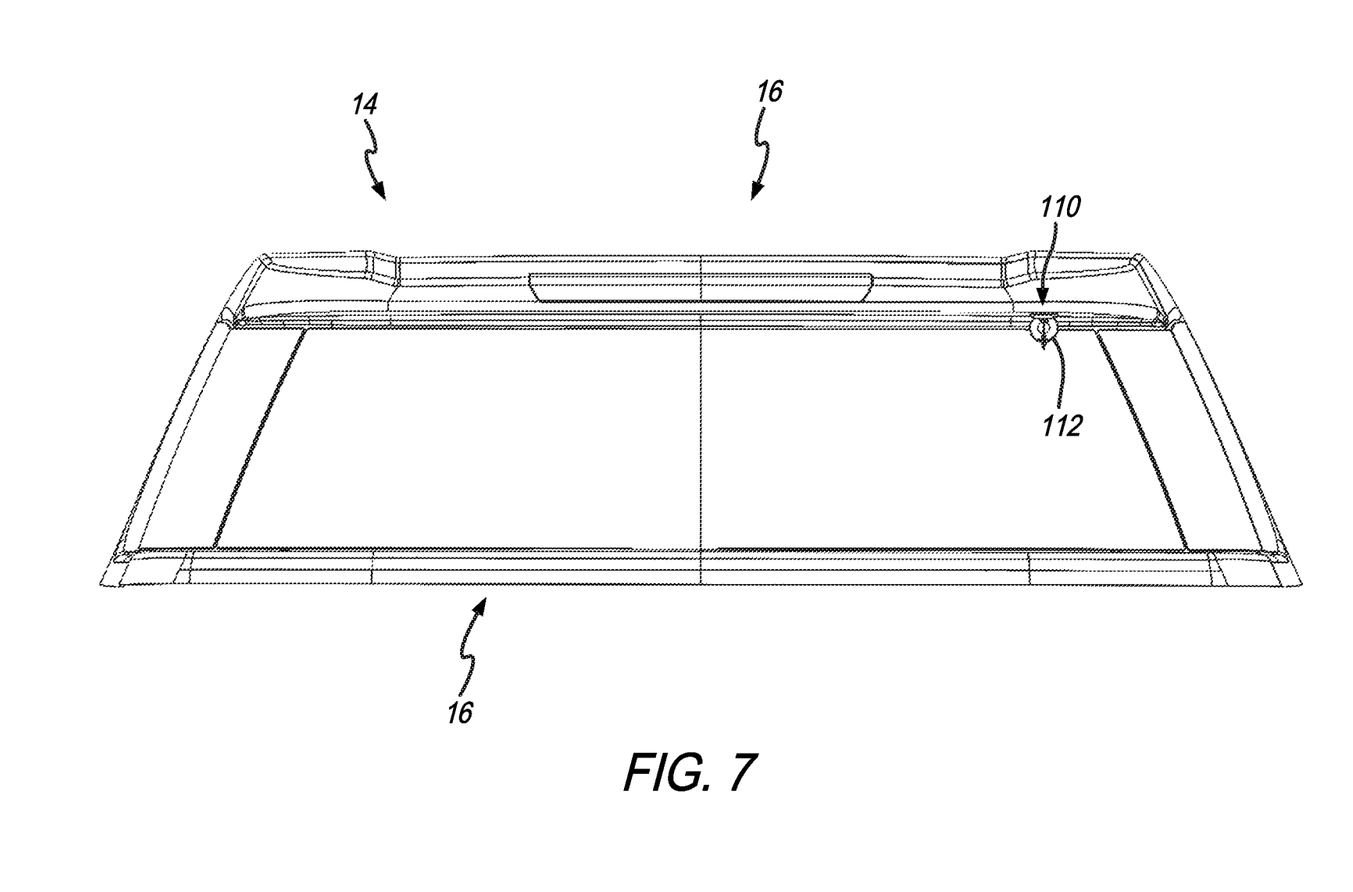
FIG. 7 is a rear end view of the truck cap door.

Another aspect of the present disclosure includes a mechanical override system 110 that is illustratively part of cap door 16 as introduced in the end view of cap door 16 shown in FIG. 7. In an illustrative embodiment, mechanical override system 110 includes a key cylinder 112, or other like mechanical unlatching structure such as a rotating rod, lever, button, or the like. Illustratively, key cylinder 112 is placed, in this instance, in a non-discrete portion of cap door 16 so as not to interfere with the aesthetics of same. It is appreciated that mechanical override system 110 may alternatively be located on truck bed cap 14 or other structure associated with cap door 16 in order to unlatch same.

Figure 8:
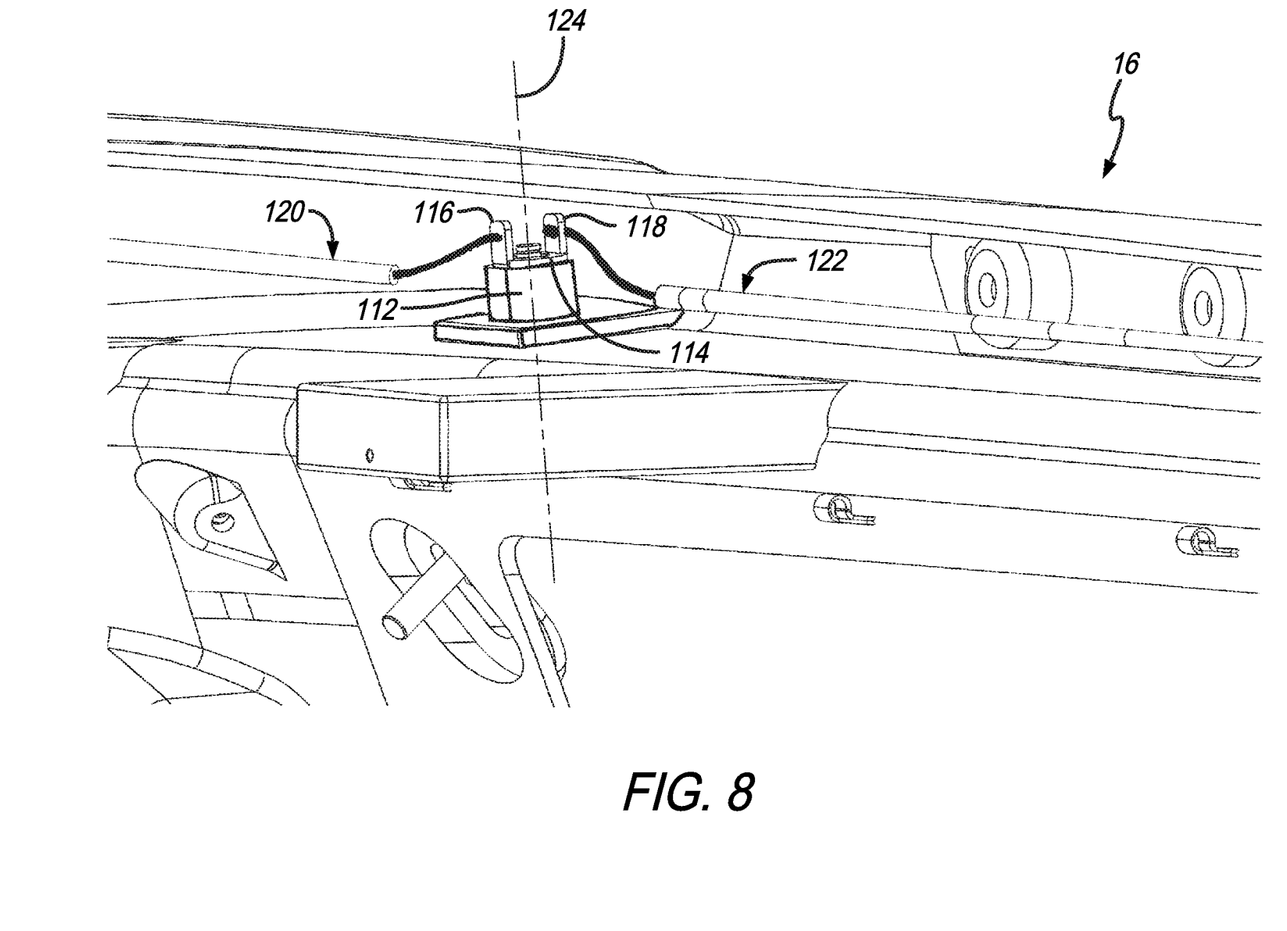
FIG. 8 is a detail perspective view of a portion of the interior of the truck cap door.

In the unlikely event that the truck battery cannot supply power to controller 48, or some other failure preventing same from opening cap door 16, key cylinder 112 may be rotated using a key or other like structure to mechanically actuate rotary latches 46 and 46' (in the case of 2 rotary latches). In the detail perspective view of the interior of cap door 16 shown in FIG. 8, key cylinder 112 is shown attached to a rotating member 114 that includes posts 116 and 118. A cable 120 is shown attached to post 116, whereas a second cable 122 is shown attached to post 118. In the illustrative embodiment, posts 116 and 118 are offset from a longitudinal axis 124 extending through both rotary member 114 and key cylinder 112. This means that rotating key cylinder 112 about axis 124 will cause cables 120, 122 to move some distance. It is appreciated that the structures may be modified or alternative structures such as rods, pins or other like members may be used to accomplish the process herein described with respect to mechanical override system 110.

Figure 9:
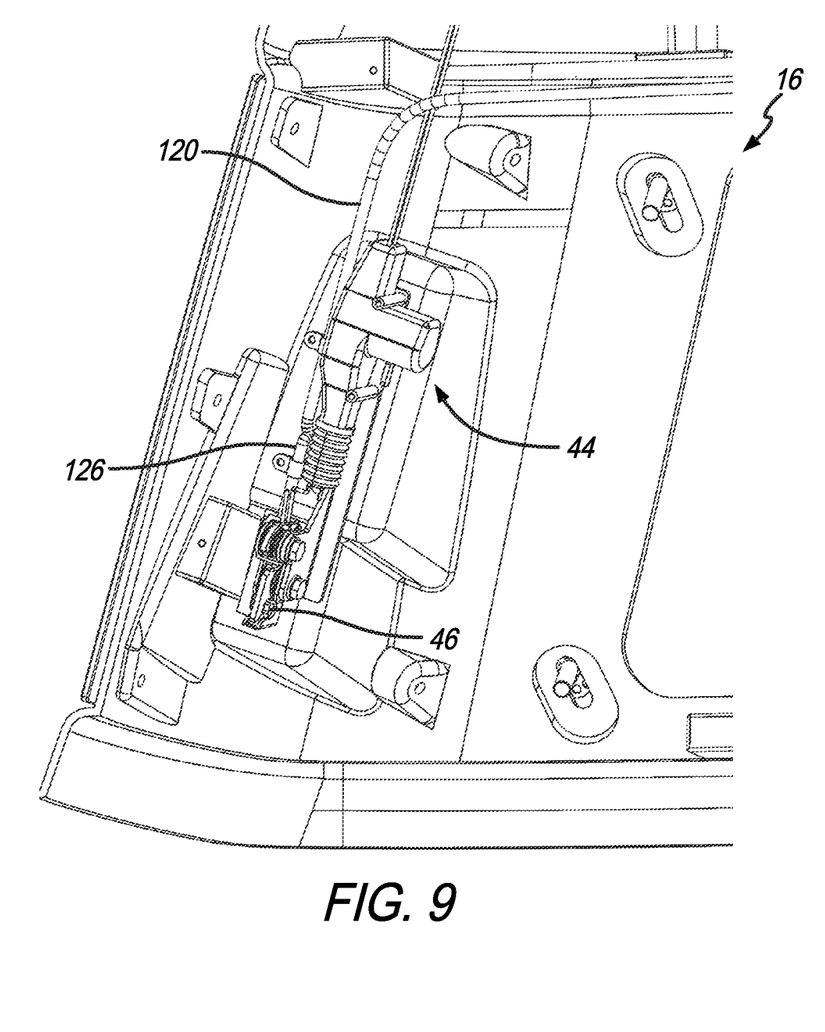
FIG. 9 is a perspective detail view of a portion of the interior of the truck cap door.

A perspective detail view of a portion of the inside of cap door 16 is shown in FIG. 9. This view depicts actuator 44 and rotary latch 46. Additionally, shown is cable 120 also attached to rotary latch 46 at 126. This means that by moving cable 120 via key cylinder 112, cable 120 has the capability to pull rotary latch 46 the same as clip 52 from actuator 44 (see, also, FIG. 3). In other words, by rotating key cylinder 112, cables 120 and 122 pull their respective rotary latches

46 and 46'. This may illustratively be accomplished in similar fashion to a bicycle brake handle that when squeezed, draws its cable to move wheel brake pads to grip a bike tire. The principals are similar. It is appreciated that other mechanisms such as rods, bars or the like, may be employed to alternately move rotary latch 46 if actuator 44 is incapacitated and cannot do so.

Fiberglass Tonneau Cover Control

A similar controller, actuator, and latching system as described above with respect to truck cap 14 may also be employed on a Fiberglass tonneau cover. In this case, the hinged cover of the fiberglass tonneau cover may be unlatched from the truck bed side walls in a similar manner as cap door 16 unlatches from truck cap 14 described above. In use with the fiberglass tonneau cover, the controller would be of similar construction to that above. In contrast, however, since there are typically no windows in a fiberglass tonneau, the controller and keypad/touchpanel may be integrated in to a sealed box attached to the fiberglass tonneau cover or otherwise isolated from detrimental environmental affects that truck 2 may be exposed to. The keypad/touchpanel may be exposed in some manner, cut out through the fiberglass cover, for example, while the remaining components of the system is sealed or otherwise protected from environmental contaminants including automotive chemicals. It is appreciated that in addition to the keypad/touchpanel, a phone app, key fob, key, Bluetooth device, Wifi device, RFID device, NFC device, computer, other mobile connected device, or similar electronic input device or mechanism may be used to connect and control the cover as discussed with respect to truck cap 14.

Rolling Tonneau Cover Control

In another illustrative embodiment, a motorized rolling tonneau cover control system may be provided. Such a control system may be used on rolling, folding, and retracting tonneau covers. This tonneau cover control system may include a controller, actuator, and latching system. These systems may also be similar to those described above with respect to truck cap 14. Here those systems may be incorporated into the motorized rolling tonneau cover. In this instance, however, instead of a momentary switch closure, an additional interface will be employed to a control board of the motorized retractable tonneau cover. This interface may provide two-way communication between the tonneau cover's control board and an interfacing Bluetooth device (or phone app, key fob, key, Wifi device, RFID device, NFC device, computer, other mobile connected device, or similar electronic input device), in order to maintain control over the tonneau cover's movements and be able to stop motion if a position other than fully open is desired. Additional safety protocols may be employed to determine that the retracting cover is not at its "home" position (i.e., closed) or at its fully retracted position (i.e., open).

Additional mechanisms such as sensors may be connected to determine whether the retracting cover impacts an obstacle during its close sequence. In this application, when commanded open, the motorized retractable tonneau cover will be released from a locked closed position and retracted via motor to a storage canister. When commanded close, the motorized retractable tonneau cover will be extended (via the same motor) until it reaches the closed position and latches in place. An additional mechanism may be employed to make certain the cover is latched in place and not just fully extended. A separate keypad/touchpanel may also be incorporated to operate the system.

Other Applications

The control system as described above may be further expanded to control systems both within and around trucks caps and tonneau covers. Such additional applications include truck accessory devices that offer environmental protection and security of items within or around the truck. Such applications include:

(1) controlling internal/external lighting (on, off, brightness);

(2) arming/disarming an incorporated security system;

(3) operating audio/video systems including powering on/off, controlling input sources, controlling volume, etc.; and (4) other low voltage electrical systems that may be incorporated in the truck cap or tonneau cover including power distribution, Wifi or cellular connectivity, etc. . . . .

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional Patent Application differs from the priority Application, the disclosure from this non-provisional Patent Application controls.

What is claimed:

1. A truck cap assembly that selectively covers a truck bed of a truck, the truck cap assembly comprising:
    a cap that sets on opposing side walls of the truck;
    a cap door located on the cap;
    a latch bar located on the cap;
    a latch release assembly attached to the cap door;
    a controller located on the cap door;
    wherein the controller is in electrical communication with the latch release assembly;
    wherein the latch release assembly includes a motor, a clip, and a rotary latch;
    wherein the clip is movable by the motor and is coupled to the rotary latch;
    wherein a signal from the controller activates the motor which moves the clip;
    wherein the rotary latch includes a latch arm that is movable about a pivot pin;
    wherein the latch arm of the rotary latch is engagable with and releaseable from the latch bar;
    wherein as the motor moves the clip, the clip moves the latch arm to cause the latch arm to pivot about the pivot pin which releases the latch arm from the latch bar to release the cap door; and
    a second latch release assembly attached to the cap door spaced apart from the latch release assembly, wherein the second latch release assembly includes a motor, a clip, and a rotary latch, wherein the controller is in electrical communication with the second latch release assembly, wherein the signal from the controller activates the motor of the second latch release assembly which moves the clip which moves a latch arm to cause the latch arm to pivot about the pivot pin which releases the latch arm from a second latch bar on the cap to release the cap door.

2. The truck cap assembly of claim 1, further comprising at least one prop attached to the cap and the cap door.

3. The truck cap assembly of claim 1, wherein when the latch arm is released from the latch bar the latch arm pushes against the latch bar to separate at least a portion of the cap door from the cap.

4. The truck cap assembly of claim 1, further comprising at least one prop attached to the cap and the cap door, wherein when the latch arm is released from the latch bar, wherein the latch arm pushes against the latch bar to separate at least a portion of the cap door from the cap; and wherein the at least one prop moves the cap door to an open position.

5. The truck cap assembly of claim 1, further comprising an input device that sends a signal to the controller to release the latch arm from the latch bar to release the cap door, wherein the input device is selected from the group consisting at least one of a keypad, a phone app, a key fob, a key, a Bluetooth device, a Wifi device, a RFID device, a NFC device, and a computer.

6. The truck cap assembly of claim 1, wherein the clip of the latch release assembly is pulled by the motor.

7. The truck cap assembly of claim 1, further comprising a mechanical override assembly located on the cap door which comprises: a rotating member, a first cable is attached to a first post on the rotating member, wherein the first post is offset from an axis extending through the rotating member, wherein the first cable is attached to the latch arm of the rotary latch of the latch release assembly so that as the rotating member rotates the first cable moves to move the latch arm of the rotary latch of the latch release assembly to release from the latch bar.

8. The truck cap assembly of claim 7, further comprising a key cylinder that is rotated which rotates a rotating member.

9. The truck cap assembly of claim 1, further comprising a mechanical override assembly located on the cap door, the mechanical override assembly comprises: a rotating member, a first cable attached to a first post on the rotating member, a second cable attached to a second post on the rotating member, wherein the first and second posts are located offset from an axis of rotation of the rotating member, wherein the first cable is attached to the latch arm of the rotary latch of the latch release assembly and the second cable is attached to the latch arm of the rotary latch of the second latch release assembly, wherein as the rotating member rotates both first and second cables move so the first cable moves the latch arm of the rotary latch of the latch release assembly to release from the latch bar and the second cable moves the latch arm of the rotary latch of the second latch release assembly to release from the second latch bar.

10. The truck cap assembly of claim 9, further comprising a key cylinder that is rotated which rotates a rotating member.

11. A truck cap assembly that selectively covers a truck bed of a truck, the truck cap assembly comprising:
a cap that sets on opposing side walls of the truck;
a cap door located on the cap;
a first latch bar and a second latch bar each located on the cap;
a controller located on the cap door;
a first latch release assembly which includes a motor and a latch arm; and
a second latch release assembly which includes a motor and a latch arm;
wherein the controller is in electrical communication with the motor of the first latch release assembly and the motor of the second latch release assembly;
wherein a signal from the controller activates the motor of the first latch release assembly to move the latch arm of the first latch release assembly and the motor of the second latch release assembly to move the latch arm of the second latch release assembly; and
wherein the latch arm of the first latch release assembly is releaseable from the first latch bar and the latch arm of the second latch release assembly is releasable from the second latch bar to release the cap door.

12. The truck cap assembly of claim 11, further comprising at least one prop attached to the cap and the cap door.

13. The truck cap assembly of claim 11, wherein when the latch arm of the first latch release assembly is released from the first latch bar, and wherein the latch arm of the first latch release assembly pushes against the first latch bar to separate at least a portion of the cap door from the cap.

14. The truck cap assembly of claim 11, further comprising at least one prop attached to the cap and the cap door, wherein when the latch arm of the first latch release assembly is released from the first latch bar the latch arm of the first latch release assembly pushes against the first latch bar to separate at least a portion of the cap door from the cap; and wherein the at least one prop moves the cap door to an open position.

15. The truck cap assembly of claim 11, further comprising an input device that sends a signal to the controller to release the latch arm of the first latch release assembly from the first latch bar to release the cap door, wherein the input device is selected from the group consisting at least one of a keypad, a phone app, a key fob, a key, a Bluetooth device, a Wifi device, a RFID device, a NFC device, and a computer.

16. A truck cap assembly that selectively covers a truck bed of a truck, the truck cap assembly comprising:
a cap that sets on opposing side walls of the truck;
a cap door located on the cap;
a first latch bar and a second latch bar;
a first latch release assembly which includes a motor and a latch arm;
a second latch release assembly which includes a motor and a latch arm;
wherein the motor of the first latch release assembly selectively moves the latch arm of the first latch release assembly;
wherein the motor of the second latch release assembly selectively moves the latch arm of the second latch release assembly; and
wherein the latch arm of the first latch release assembly is releaseable from the first latch bar and the latch arm of the second latch release assembly is releaseable from the second latch bar to release the cap door.

17. The track cap assembly of claim 16, wherein the first latch bar is located on the cap and the first latch release assembly is located on the cap door.

18. The track cap assembly of claim 16, wherein the first latch bar is located on the cap door and the first latch release assembly is located on the cap.

* * * * *